United States Patent Office 3,133,838
Patented May 19, 1964

3,133,838
COMPOSITION AND METHOD OF COATING WITH A MIXTURE OF ALLYL ALCOHOL-STYRENE COPOLYMER, EPOXY RESIN AND PHOSPHORIC ACID
William A. Higgins, Cleveland, Ohio, assignor to The Lubrizol Corporation, Wickliffe, Ohio, a corporation of Ohio
No Drawing. Filed Sept. 21, 1961, Ser. No. 139,623
10 Claims. (Cl. 148—6.15)

This invention relates to liquid compositions suitable for use in providing protective films for metal surfaces. It relates also to a process by which such liquid compositions are applied to metal surfaces and then treated to form these protective films.

The treatment of metal surfaces, especially ferrous metal surfaces, to provide them with protective, chemical coatings has long been known. Such coatings usually are provided by treatment with an acidic, inorganic chemical solution which reacts with the metal surface to provide an integral coating. Coatings of this type have the important advantage of being permanent, i.e., they cannot be removed by ordinary handling or minor abrasive wear. Another type of treatment to provide a protective surface coating involves the deposition of a residual film from a solution of a film-forming material in a relatively volatile solvent. In this case the resulting film is not attached chemically to the metal surface, as is the case above, and must, therefore, depend for its permanence on the attraction of physical forces. Although films of this type are not as permanent, they do have the important advantage of much more efficient application, i.e., there is less loss of film-forming ingredients in the application of a film from a relatively volatile organic solvent than there is from the application of an integral chemically reacted film from an acidic solution.

It will be seen, thus, that while each of these types of protective films for metal surfaces enjoys a particular advantage, each suffers also from a disadvantage. The integral, chemically reacted film obtained from an aqueous acidic solution is inherently expensive because of the inefficiency of its application, and the residual film obtained from a solution in a relatively volatile organic solvent is not as permanent as it might be.

It is accordingly, a principal object of the present invention to provide novel liquid compositions suitable for use in providing protective films for metal surfaces.

Another object of the present invention is to provide a process for providing protective films for metal surfaces.

Still another object of the present invention is to provide treated metal surfaces which are resistant to deterioration with respect to corrosion such as rusting.

Still another object of the present invention is to provide protective coatings for metal surfaces which are both permanent and susceptible to efficient application.

These and other objects are made possible by a liquid composition, suitable for use in providing a protective film for a metal surface, comprising a polymeric polyol, from 0.05 to 5.0 parts of an epoxy aryl ether and from 0.1 to 2.0 parts of phosphoric acid. The polymeric polyol generally is a copolymer of allyl alcohol and a styrene, said copolymer having an average molecular weight within the range of 500–2500.

The manner in which the liquid composition of this invention is prepared ordinarily involves mixing the copolymer of allyl alcohol and a styrene with the epoxy aryl ether, in the stated proportions, prior to the addition of the phosphoric acid. The addition of phosphoric acid to this mixture of ingredients results in an exothermic reaction. This indicated order of mixing these three ingredients may be varied.

These compositions most usually are employed as solutions in organic solvents. Either volatile or non-volatile solvents may be used, depending upon the manner in which the film-forming composition is applied to the metal surface. When it is desired to coat the metal surface by immersion, relatively volatile solvents such as methyl isobutyl ketone, isobutyl alcohol, ethyl acetate, etc., are indicated; mixtures of such solvents frequently are used. When the coating compositions are to be sprayed onto a metal surface, either volatile or non-volatile solvents may be used. Thus, methyl isobutyl ketone, a volatile solvent, or butyl Cellosolve, a relatively non-volatile solvent, may be used for spraying. In the case of roller coating it is preferable to use a non-volatile solvent such as butyl Cellosolve. Generally they are oxygenated solvents, as illustrated above, although mixtures of oxygenated solvents and hydrocarbon solvents provide satisfactory results.

The use of a solvent serves not only to insure the ready solubility of all the ingredients of the coating compositions, but also to aid in the deposit of a thin, uniform residual protective film on the metal surface. Sometimes the copolymer of allyl alcohol and a styrene is dissolved in a solvent before adding the other ingredients; likewise the epoxy aryl ether may first be dissolved in a solvent before it is added to the composition. Or, these two ingredients may first be mixed, and then the solvent (or mixture of solvents) added before adding the phosphoric acid. In other words, the stage at which a solvent or mixture of solvents is to be added is not critical.

The process by which a protective film may be provided for a metal surface in accordance with this invention comprises preparing a liquid mixture containing a copolymer of allyl alcohol and a styrene, said copolymer having an average molecular weight within the range of 500–2500, from 0.05 to 5.0 parts of an epoxy aryl ether, adding to said liquid mixture from 0.1 to 2.0 parts of phosphoric acid, applying a film of the resulting liquid mixture to a metal surface, and heating said film to a temperature within the range of 100–400° C. As indicated earlier, the application of the film of this liquid mixture to a metal surface may be accomplished in any of the ordinary ways, viz., immersion, spraying, roller coating, etc.

An especially important feature of the invention resides in the property of the protective film deposited on a metal surface of providing satisfactory protection to that metal surface even as a very thin film. Thus, a film having a thickness of less than 0.1 mil provides a very satisfactory degree of protection from normal deterioration. The thickness of such films can be expressed also in terms of density, i.e., milligrams per square foot (mg./ft.$^2$) and the range of such thickness which has been found to be peculiarly applicable to the liquid compositions of this invention is 25–300 mg./ft.$^2$. This range of thickness describes the final, dried protective film; it does not apply to the freshly deposited liquid composition which is the precursor of the protective coating. It is especially advisable to deposit films of this thickness, not only to employ the liquid composition efficiently, but also to avoid a darkening of the color of the final film as it is subjected to a step of heating. This latter hazard is particularly important where a relatively large proportion of phosphoric acid is used in formulating the liquid coating composition.

The copolymer of allyl alcohol and a styrene preferably is a low molecular weight copolymer prepared from an approximately equimolar mixture of the two monomers. The molecular weight of the copolymer should be within the range from about 500 to about 2500. The styrene monomer may be styrene itself, and most usually is, or it may be any of the various substituted styrenes such as monochlorstyrene, alkyl-substituted styrene, and alpha-substituted styrene in which latter the substituent is an alkyl group, preferably methyl.

The epoxy aryl ethers are, as indicated, compounds which contain both epoxy groups and aryl ether groups. They are prepared conveniently by the reaction of epichlorohydrin with phenolic compounds. Thus the reaction of epichlorohydrin with amyl phenol, shown below, produces the epoxy aryl ether

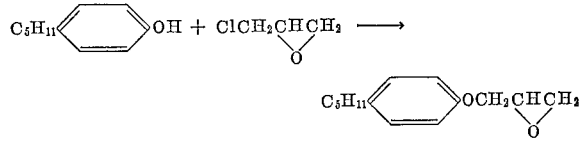

indicated as the product. Ordinarily, for the purposes of this invention, the phenolic compound is bis-phenol A (di-hydroxyphenyl dimethyl methane), or a phenol-formaldehyde resin, or some such aldehyde-phenol resin. Commercially available products of this type, prepared from bis-phenol A, include the Epon resin, marketed by Shell Chemical Company; the Epotuf resins, marketed by the Reichhold Chemical Company; the D.E.R. resins, marketed by the Dow Chemical Company; and the D.E.N. resins (prepared from a phenol-formaldehyde resin), marketed by the Dow Chemical Company.

Particular methods for the preparation of such epoxy aryl ethers are disclosed in U.S. Patents 2,503,726; 2,582,985; 2,592,560; and 2,694,694.

Other phenols may be used, and polyhydric phenols are preferred for such use. Illustrative of such other phenols are resorcinol, hydroquinone, catechol, and analogous polyhydric anthracenes and naphthalenes.

In addition to epichlorohydrin, which is preferred, various other halohydrins may be used. Epibromohydrin, the epihalohydrins of mannitol, sorbital and erythritol, glycerol dichlorohydrin, etc., all are suitable.

The preferred epoxy aryl ethers of this invention are those which contain on the average more than one epoxy group and more than one aryl ether group per molecule.

As for the phosphoric acid component of the liquid coating compositions, it is preferred to use 85% aqueous phosphoric acid. More concentrated phosphoric acid solutions can be used, and in some instances it is preferable to use 100% phosphoric acid, or an even more concentrated form of phosphorus pentoxide. Frequently, however, the use of such latter concentrations, viz., mixtures of phosphoric acid and phosphorus pentoxide, results in liquid coating compositions containing very small amounts of insoluble particles, and while these coating compositions are otherwise suitable, their initial appearance is a disadvantage. In other cases it is desirable to use less concentrated phosphoric acid solutions as for example, 60% phosphoric acid or 25% phosphoric acid. These more dilute solutions sometimes cause solubility problems, i.e., the liquid coating composition may be hazy or consist of two layers, but still they yield good protective films in the process of this invention. Optimum results are obtained by the use of aqueous phosphoric acid solutions having a concentration within the range of from 10 to 100%.

The liquid coating compositions of this invention are useful on virtually all known metal surfaces. They are most useful on ferrous metal surfaces and are very effective on such surfaces in resisting the formation of rust. They are effective also, however, on galvanized metal and on aluminum particularly. They are epecially valuable as primers, applied on ferrous metal surfaces, for the subsequent application of paints of all kinds. In this latter application they provide a particularly receptive surface to paints, i.e., the paint adheres well to such surfaces. Phosphated metal surfaces, especially phosphated ferrous metal surfaces, are improved markedly with respect to their rust-protective and paint-retentive properties, by the subsequent application of the protective film described herein. Such phosphated ferrous metal surfaces which have been phosphated by a calcium-containing, zinc phosphating bath, as described in application Ser. No. 373,449, filed August 10, 1953, are especially suitable.

The step of heating the applied liquid film, or "curing" or "baking" as this step is more commonly called, is carried out within the temperature range of 100–400° C. It can be carried out immediately after the liquid film is applied, but where a large amount of phosphoric acid has been used the liquid film is allowed to stand at room temperature for a period of time ranging from about 1 to about 60 minutes before this curing or baking step. There appears to be a reaction during this latter period of time (at room temperature) between the metal of the metal surface and unreacted phosphoric acid or the acidic phosphate. In any event there appears to be a relationship between whatever reaction does take place and the quality of the ultimate protective film which results and it is important, in those cases where the liquid film contains a relatively large amount of phosphoric acid, that there be at least one minute of time elapsed between the application of the liquid film and the beginning of the baking or curing step.

The baking step, as indicated above, is to be carried out at a temperature within the range of 100–400° C. Preferably this baking temperature is within the narrower range of 150–250° C. This baking step serves not only to evaporate from the liquid film all of the solvent, but also to cause an apparent cross-linking reaction which gives to the film its permanent nature.

The following are illustrative examples of the liquid coating compositions of this invention.

EXAMPLE 1

A solution of 54 parts of a copolymer (molecular weight: 1100) of equimolar proportions of allyl alcohol and styrene in 54 parts of methyl isobutyl ketone is added to a solution of 41.4 parts of an epoxy aryl ether (molecular weight: 950) prepared by the reaction of bis-phenol A and epichlorohydrin, in 14 grams of a 2:1 mixture of methyl isobutyl ketone and xylene. To the resulting solution there is added 336 parts of a 2:1:1 mixture of methyl isobutyl ketone, ethyl acetate and isobutyl alcohol. To this solution there is then added 100 grams of 85% aqueous phosphoric acid.

A 4" x 8", 20 gage SAE steel panel is vapor degreased (with trichloroethylene) and then immersed in a bath, at room temperature, of the above solution, withdrawn immediately, allowed to dry by evaporation, and then baked at 232° C. for five minutes. The resulting film has a density of 256 mg./ft.$^2$. The film density of the baked film varies with the concentration of the bath from which the film is derived; a more concentrated bath will give a denser, thicker film.

EXAMPLE 2

The procedure of Example 1 is followed except that the ratio of allyl alcohol-styrene copolymer/epoxy aryl ether/phosphoric acid is 1.00/0.76/1.27 (this ratio of Example 1 is 100/0.76/1.55). Also, the concentration of the solution is adjusted so as to produce a film density on the coated steel panel of 157 mg./ft.$^2$.

EXAMPLE 3

The procedure of Example 1 is followed except that the ratio of allyl alcohol-styrene copolymer/epoxy aryl ether/phosphoric acid is 1.00/0.76/1.00. The concentration of the coating solution likewise is adjusted to produce a film density of 162 mg./ft.$^2$.

EXAMPLE 4

The procedure of Example 1 is followed except that the ratio of allyl alcohol-styrene copolymer/epoxy aryl ether/phosphoric acid is 1.00/0.76/0.80. The density of the baked film is 154 mg./ft.$^2$.

EXAMPLE 5

The procedure of Example 1 is followed using a ratio of allyl alcohol-styrene copolymer/epoxy aryl ether/phosphoric acid of 1.00/0.76/0.63. The density of the baked film is 149 mg./ft.$^2$.

EXAMPLE 6

The procedure of Example 1 is followed except that the ratio of allyl alcohol-styrene copolymer/epoxy aryl ether/phosphoric acid is 1.00/0.76/0.33. Here again the density of the baked film is 149 mg./ft.$^2$.

EXAMPLE 7

The procedure of Example 1 is followed except that the ratio of allyl alcohol-styrene copolymer/epoxy aryl ether/phosphoric acid is 1.00/0.86/0.20. The density of the baked film is 205 mg./ft.$^2$.

EXAMPLE 8

The procedure of Example 1 is followed except that the reaction product of equimolar amounts of p-tert-amyl-phenol and epichlorohydrin is used as the epoxy aryl ether. The density of the baked film is 126 mg./ft.$^2$.

EXAMPLE 9

The procedure of Example 8 is followed except that the ratio of allyl alcohol-styrene copolymer/epoxy aryl ether/phosphoric acid is used is 1.00/0.35/1.57. The density of the baked film is 106 mg./ft.$^2$.

EXAMPLE 10

The procedure of Example 1 is followed except that the epoxy aryl ether is a condensation product (molecular weight: 600) of chemically equivalent amounts of epichlorohydrin and a phenol-formaldehyde resin, and the ratio of allyl alcohol-styrene copolymer/epoxy aryl ether/phosphoric acid is 1.00/1.10/0.58. The density of the baked film is 159 mg./ft.$^2$.

EXAMPLE 11

The procedure of Example 1 is followed except that the molecular weight of the allyl alcohol-styrene copolymer is 1900. The density of the baked film is 189 mg./ft.$^2$.

EXAMPLE 12

The procedure of Example 11 is followed except that the ratio of allyl alcohol-styrene copolymer/epoxy aryl ether/phosphoric acid is 1.00/0.43/0.87. The density of the baked film is 192 mg./ft.$^2$.

EXAMPLE 13

The procedure of Example 11 is followed except that the molecular weight of the allyl alcohol-styrene copolymer is 750. The density of the baked film is 119 mg./ft.$^2$.

EXAMPLE 14

The procedure of Example 13 is followed except that the ratio of allyl alcohol-styrene copolymer/epoxy aryl ether/phosphoric acid is 1.00/1.27/2.60. The density of the baked film is 114 mg./ft.$^2$.

The protective films of this invention are useful as primers for the subsequent application of paint to a metal surface. They provide a more even, retentive surface for a paint film. They impart also a resistance to corrosion, particularly to the spread of corrosion caused by scoring or rupture of the paint film. This latter is known as "under cutting."

The improved qualities of a painted metal surface which has been previously treated with the film-forming composition of this invention are shown by the experimental test data of Table I. Ferrous panels coated as in the above examples are sprayed with a white alkyd paint which is then baked for 20 minutes at 160° C. The paint film is about 1 mil thick. The paint film on each panel then is ruptured by scoring a 6-inch line on the surface of each panel. The scored panels are then subjected to the salt-fog test according to which the panels are placed in a cabinet containing a 5% aqueous sodium chloride solution at 95° F. Air is bubbled through this solution to produce a corrosive salt atmosphere which acts on the surface of the test panels, suspended above the level of the salt solution. The exact conditions of this test are described at ASTM D117–57T.

*Table I*

| Panel of Example | Percent Adhesion | Creep |
|---|---|---|
| Blank | 20 | >10 |
| 1 | 100 | 0 |
| 6 | 96 | 2 |
| 7 | 92 | 4 |
| 8 | 99 | 1 |
| 9 | 98 | 1 |
| 10 | 95 | 0 |
| 11 | 100 | |
| 12 | 98 | |
| 13 | 98 | |
| 14 | 97 | |

The panels are allowed to remain in this atmosphere for five days, then removed and scraped with a 1-inch putty knife to remove all loose paint about the scored lines. This loose paint is the result of "under cutting corrosion" and provides a measure of this type of corrosion. The panels are rated visually to determine the percent adhesion about this scored line, and also to determine, in 32nds of an inch, the extent of the corrosion away from the scored line.

The "blank" in Table I is a panel which is vapor degreased, in exactly the same manner as the other panels, but which is not coated with the protective film of this invention. It is then painted in exactly the same fashion as are the other panels. In other words, the blank differs from the other test panels of Table I only in that it does not contain the protective film of this invention. It will be noted that it scores 20 in the "Percent Adhesion" column and "more than 10" in the "Creep" column whereas all of the test panels are much superior in each of the categories.

Another method of testing the efficacy of the coated panels of this invention also employs a painted panel as described above. That is, the panels coated as in the above examples are sprayed with a white alkyd paint which then is baked on at 160° C. for 20 minutes. These panels then are immersed in distilled water maintained at 160° F. for 16 hours. The panels are then removed and inspected for the appearance of blisters. The size of the blisters is indicated by a numerical rating ranging from 2 (for very large) to 10 (for none at all). The concentration of blisters is also noted and this is indicated by a rating of "dense," "medium dense," "medium," or "few."

It should be noted, in Table II, that the blank here is scored as "8 MD." This means that the painted panel contained a rather high concentration of moderately large blisters. On the other hand, the test panels which are treated in accordance with this invention contained no blisters at all after the 16 hours of immersion in distilled water.

*Table II*

| Panel of example: | Blisters |
|---|---|
| Blank | 8 MD |
| 1 | None |
| 2 | None |
| 3 | None |
| 4 | None |
| 5 | None |
| 6 | None |
| 7 | None |
| 8 | None |
| 9 | None |
| 10 | None |
| 11 | None |
| 12 | None |
| 13 | None |
| 14 | None |

An inspection of the data in Table III shows that each of the panels prepared in accordance with this invention also scored much better than the blank panel in the reverse impact test. This test, carried out at 60° F., employs the Gardner Variable Impact Tester in which the test panel is placed horizontally over a ⅝ inch diameter hole in a base plate. A 2-pound steel rod, rounded at the bottom, is dropped from a specified height (in inches) through a graduated tube so that it strikes the test panel over the ⅝ inch hole in the base plate. The height from which the steel rod is dropped on the test panel is increased until the panel "dimples" and causes the paint film to flake or crack. The greatest height from which this steel rod is dropped and leaves the paint film unruptured is taken as a measure of the paint film's resistance to impact. The test results are expressed in terms of inch-pounds, i.e., calculated by multiplying the height in inches by the weight in pounds of the steel rod. The particular equipment used in this case is capable of measuring impact resistance up to 160 inch-pounds. Either side of the impacted test panel may be inspected for failure of the paint film, but the convex of the "dimple" produces failure first. All of the test data reported in Table IV are based on an inspection of the convex side of the "dimple" of the test panels, thus the name "reverse impact test."

*Table III*

| Panel of example: | Inch-pounds |
|---|---|
| Blank | <20 |
| 6 | 100 |
| 7 | 160 |
| 9 | 50 |
| 10 | 90 |
| 13 | 50 |
| 14 | 44 |

Still another ASTM test which demonstrates the advantages of a painted ferrous panel that has been previously treated with the coating composition of this invention is the conical mandrel test. This is described in detail in ASTM D522–41. The painted, coated ferrous panel, as above, is mounted in the apparatus so that the form imposed on it through bending will assume the conical shape of the mandrel extending from its smallest dimension (radius) to its dimension four inches away from this smallest dimension. The test panel is bent along its four inch dimension. The test is carried out in a room in which the temperature is maintained at 60° F. The panel then is removed from the apparatus and Scotch tape applied to the painted surface on the outer portion of the conical section of the panel. The tape then is removed suddenly and any paint which has become loosened as a result of the bending step is removed at the same time. The panels are rated in terms of percent paint adhesion on this outer conical section from which the Scotch tape has been removed. A completely intact and uniform paint film over this entire area merits a rating of 100 percent.

A second rating is obtained by immersing the unbent portion of the panel in distilled water, maintained at 160° F., for 16 hours and then noting the condition, particularly the presence of any blisters, of the outer conical section from which the Scotch tape has been removed. The presence of blisters is noted according to the scale mentioned above, i.e., "H" for heavy, "M" for medium, and "F" for few.

The data of Table IV shows the results of conical mandrel tests. It will be noted that the blank scores notably poorer than any of the test panels prepared in accordance with this invention.

*Table IV*

| Panel of Example | Percent Adhesion | |
|---|---|---|
| | Before H₂O Immersion | After H₂O Immersion |
| Blank | 92 | 58 H |
| 1 | 100 | 78 F |
| 2 | 92 | 76 M |
| 3 | 96 | 79 M |
| 4 | 95 | 74 M |
| 5 | 100 | 80 F |
| 6 | 100 | 73 F |
| 7 | 100 | |
| 8 | 93 | |
| 9 | 100 | |
| 10 | 100 | |
| 11 | 98 | |
| 13 | 99 | |
| 14 | 99 | |

The utility of the coating composition of this invention as a paint primer for galvanized steel has also been demonstrated. Galvanized panels, 4 x 8, treated with the coating compositions of Examples 1 and 6 to provide film densities respectively of 135 and 133 mg./ft.$^2$, are spray-painted with a white alkyd paint and the paint baked on as before, then subjected to the salt-fog test, the water immersion test, and the conical mandrel test. In each case these test panels are shown to be far superior to a blank panel, i.e., one which is painted with the white alkyd paint, but which is not previously treated with the coating composition of this invention. A similar superiority for the panels treated in accordance with this invention is demonstrated in the Butler abrasion test, according to which ½ x 3 inch panels are subjected to the abrasive action of porcelain cylinders (13⁄16 inch x 13⁄16 inch) and sand and water for 45 minutes in a rolling cylindrical jar. At the end of this time a piece of Scotch tape is applied to the surface of the panel and then suddenly removed. Any paint which has been loosened by this abrasive action is removed with the tape and the panel is rated in terms of the percent of paint which adheres.

The coated galvanized steel panel, prepared in accordance with this invention, is found to be superior also in a "cross-hatch adhesion test." Here the test panel is scratched by a set of 11 razor blades, 1⁄16 inch apart, mounted in a holder. A second scratch, at right angles to the first, is made so that the paint film is thus scored to form 100 small squares. A piece of pressure-sensitive adhesive tape then is pressed onto this cross-hatch area and removed suddenly. The pressure-sensitive adhesive tape application is repeated until no more paint can be removed in this manner. The cross-hatch section is then rated on a scale from 0 to 10, 10 indicating complete retention of paint on the cross-hatch area.

The utility of the coating composition of this invention is applicable also to aluminum surfaces. The particular coating compositions of Examples 1 and 6 are applied to aluminum panels and these panels then painted with the same white alkyd paint used in the above tests. A comparison of these test panels with a blank aluminum panel shows that the test panels are superior in the Butler abrasion test, the water immersion test, the conical mandrel test, and the cross-hatch adhesion test.

The process of forming the protective films described herein is improved in many instances by the addition of small amounts of certain inorganic compounds to the liquid, film-forming composition applied to the metal surface. Zinc nitrate, for example, acts to accelerate the reaction by which the film is formed. Magnesium dichromate and zinc dichromate also are effective to improve this process.

What is claimed is:

1. A liquid composition, suitable for use in providing a protective film for a metal surface, comprising a mixture of one part of a copolymer of allyl alcohol and a styrene, from 0.05 to 5.0 parts of an epoxy aryl ether, and from 0.1 to 2.0 parts of phosphoric acid.

2. A liquid composition, suitable for use in providing a protective film for a metal surface, comprising a mixture of one part of a copolymer of allyl alcohol and a styrene, said copolymer having an average molecular weight within the range of 500–2500, from 0.05 to 5.0 parts of an epoxy aryl ether, and from 0.1 to 2.0 parts of phosphoric acid.

3. A liquid composition as in claim 1 characterized further in that the epoxy aryl ether is prepared by the reaction of a epihalohydrin with a phenolic compound.

4. A liquid composition as in claim 1 characterized further in that the epoxy aryl ether is prepared by the reaction of epichlorohydrin with a polyhydric phenol.

5. A liquid composition as in claim 1 characterized further in that the epoxy aryl ether is prepared by the reaction of epichlorohydrin and bis-phenol A.

6. A process for preparing a liquid composition, suitable for use in providing protective films for metal surfaces, comprising adding a solution in an oxygenated solvent of a copolymer of allyl alcohol and a styrene, said copolymer having an average molecular weight within the range of 500–2500, to a solution in an oxygenated solvent of from 0.05 to 5.0 parts of an epoxy aryl ether, and then adding to said mixture of solutions from 0.1 to 2.0 parts of phosphoric acid.

7. A process for providing a protective film for a metal surface which comprises:
   (A) applying to said metal surface a film comprising a mixture of one part of a copolymer of allyl alcohol and a styrene, said copolymer having an average molecular weight within the range of 500–2500, from 0.05 to 5.0 parts of an epoxy aryl ether, and from 0.1 to 2.0 parts of phosphoric acid, and
   (B) heating said film of (A) to a temperature within the range of 100–400° C.

8. A process as in claim 7 characterized further in that the epoxy aryl ether is prepared by the reaction of epichlorohydrin and a polyhydric phenol.

9. A process for providing a protective film for a metal surface which comprises:
   (A) applying to said metal surface a film comprising a mixture of one part of a copolymer of allyl alcohol and styrene, said copolymer having an average molecular weight within the range of 500–2500, from 0.05 to 5.0 parts of an epoxy aryl ether prepared by the reaction of epichlorohydrin with bis-phenol A, and from 0.1 to 2.0 parts of phosphoric acid, and
   (B) heating said film of (A) to a temperature within the range of 100–400° C.

10. A metal surfaces treated in accordance with the process of claim 7.

References Cited in the file of this patent

UNITED STATES PATENTS

| | | |
|---|---|---|
| 2,692,876 | Cupery | Oct. 26, 1954 |
| 2,962,462 | Chapin et al. | Nov. 29, 1960 |

OTHER REFERENCES

Skeist: I, Epoxy Resins, Reinhold Publishing Corp., 1958, p. 18.